(12) United States Patent
Andruch, III et al.

(10) Patent No.: US 8,862,340 B2
(45) Date of Patent: Oct. 14, 2014

(54) LINKAGE END EFFECTER TRACKING MECHANISM FOR SLOPES

(71) Applicant: Caterpillar Forest Products Inc., Peoria, IL (US)

(72) Inventors: John Peter Andruch, III, Hogansville, GA (US); Vinod Tukaram Yadav, LaGrange, GA (US)

(73) Assignee: Caterpillar Forest Products, Inc., Peoria, IL (US)

( * ) Notice: Subject to any disclaimer, the term of this patent is extended or adjusted under 35 U.S.C. 154(b) by 4 days.

(21) Appl. No.: 13/721,838

(22) Filed: Dec. 20, 2012

(65) Prior Publication Data

US 2014/0178166 A1    Jun. 26, 2014

(51) Int. Cl.
| | |
|---|---|
| *B66C 23/00* | (2006.01) |
| *A01G 23/081* | (2006.01) |
| *B66C 13/18* | (2006.01) |
| *E02F 9/20* | (2006.01) |

(52) U.S. Cl.
CPC ............ *B66C 13/18* (2013.01); *A01G 23/081* (2013.01); *E02F 9/2025* (2013.01)
USPC ................................................. 701/50; 701/2

(58) Field of Classification Search
CPC ......... E02F 9/2246; E02F 9/22; E02F 9/2029; E02F 9/2033; E02F 9/2041; E02F 9/2235; E02F 9/2095; E02F 9/2296; E02F 9/2292; E02F 9/2025; E02F 9/2026; E02F 9/265; B60L 2200/40; Y10S 414/125; Y10S 414/13; Y10S 3/435–3/437; Y10S 3/439; Y10S 3/46; B60T 13/662; G60F 17/00; G60F 19/00; H04L 9/3239; H04L 2209/84

USPC ............. 701/50, 2; 414/685–695.5, 710, 414/712–715, 722, 724, 917; 280/6.153, 280/6.154; 172/1, 2
See application file for complete search history.

(56) References Cited

U.S. PATENT DOCUMENTS

| | | |
|---|---|---|
| 3,252,525 A | 5/1966 | Pyles |
| 3,536,216 A | 10/1970 | Brownell et al. |

(Continued)

FOREIGN PATENT DOCUMENTS

| | | |
|---|---|---|
| CA | 2196728 | 8/1998 |
| EP | 1640512 | 3/2006 |

(Continued)

OTHER PUBLICATIONS

Caterpillar Inc.; *541 Series 2/552 Series 2 Track Feller Bunchers and Track Harvesters—FTS (Full Tail Swing)*; article; 2012; pp. 1-20.

(Continued)

*Primary Examiner* — Marthe Marc-Coleman
(74) *Attorney, Agent, or Firm* — Miller, Matthias & Hull

(57) ABSTRACT

In a work machine having a frame with a lift boom and a stick boom supporting an implement pivotally connected to the opposite end of the stick boom by a pivot pin. A controller determines the position of the pivot pin, detects a motion command signal from an operator control, determines an ending position of the pivot pin based on the motion command signal, and causes the lift boom and stick boom to rotate to orientation angles that will place the pivot pin at the ending position. When operating on a slope, the frame orientation with respect to gravity is determined so that horizontal and vertical motion commands cause the pivot pin and implement to move horizontally and vertically with respect to gravity regardless of the frame orientation. The implement can be maintained at a target orientation as the pivot pin moves by evaluating an orientation angle of the implement.

21 Claims, 8 Drawing Sheets

(56) References Cited

U.S. PATENT DOCUMENTS

| | | | |
|---|---|---|---|
| 3,547,293 A | 12/1970 | Borer et al. | |
| 3,659,734 A | 5/1972 | Fuzzell | |
| 3,884,359 A | 5/1975 | Suverkrop | |
| 4,011,959 A | 3/1977 | Papasideris | |
| 4,037,519 A | 7/1977 | Miller et al. | |
| 4,377,043 A | 3/1983 | Inui et al. | |
| 4,775,288 A | 10/1988 | Dimitriu | |
| 4,844,685 A | 7/1989 | Sagaser | |
| 4,923,362 A | 5/1990 | Fryk | |
| 5,083,894 A | 1/1992 | Ikari et al. | |
| 5,116,186 A | 5/1992 | Hanamoto et al. | |
| 5,160,239 A | 11/1992 | Allen et al. | |
| 5,356,260 A | 10/1994 | Ikari et al. | |
| 5,405,237 A | 4/1995 | Oka | |
| 5,424,623 A | 6/1995 | Allen et al. | |
| 6,173,973 B1 | 1/2001 | Robinson | |
| 6,233,511 B1 | 5/2001 | Berger et al. | |
| 6,443,196 B1 * | 9/2002 | Kurelek | 144/4.1 |
| 6,557,453 B2 | 5/2003 | Paakkunainen et al. | |
| 6,609,315 B1 | 8/2003 | Hendron et al. | |
| 6,763,619 B2 | 7/2004 | Hendron et al. | |
| 6,819,993 B2 * | 11/2004 | Koch | 701/50 |
| 6,845,334 B2 * | 1/2005 | Colburn | 702/94 |
| 6,860,703 B2 | 3/2005 | Carroll, Jr. | |
| 6,896,088 B2 | 5/2005 | Dahl et al. | |
| 6,968,241 B2 | 11/2005 | Vonnoe et al. | |
| 6,997,221 B2 | 2/2006 | Kurelek et al. | |
| 7,007,728 B2 | 3/2006 | Kurelek | |
| 7,036,248 B2 | 5/2006 | Meyeres et al. | |
| 7,079,931 B2 * | 7/2006 | Sahm et al. | 701/50 |
| 7,222,444 B2 | 5/2007 | Hendron | |
| 7,306,513 B2 | 12/2007 | Mackin et al. | |
| 8,180,532 B2 | 5/2012 | O'Halloran et al. | |
| 8,430,621 B2 | 4/2013 | Jantti | |
| 2002/0040741 A1 | 4/2002 | Ristolainen | |
| 2003/0205291 A1 | 11/2003 | DiSabatino | |
| 2004/0083628 A1 | 5/2004 | Hendron et al. | |
| 2006/0096137 A1 | 5/2006 | Hendron et al. | |

FOREIGN PATENT DOCUMENTS

| | | |
|---|---|---|
| FI | 199100197 | 7/1992 |
| JP | 57130639 | 8/1982 |
| JP | 60133126 | 7/1985 |
| WO | 0102280 | 1/2001 |

OTHER PUBLICATIONS

Caterpillar Inc; *501 501HD Track Harvesters*; article; 2008; pp. 1-4.

* cited by examiner

LINKAGE END EFFECTER TRACKING MECHANISM FOR SLOPES

TECHNICAL FIELD

The present disclosure is generally directed to material handling machines and, more particularly, to forestry equipment and similar work machines having multi-component linkages for positioning and manipulating end effecters or implements of the machine wherein horizontal movement with respect to gravity of the implement is desired when the machine is operating on horizontal and sloped surfaces.

BACKGROUND

Many work machines are in use that use multi-component linkages to position and manipulate implements that act on work material. In a typical two member linkage arrangement, a lift boom is pivotally connected at one end to an upper frame of the work machine, and pivotally connected at the other end to a stick boom. The implement is pivotally connected to the end of the stick boom opposite the connection to the lift boom. A lift cylinder connected between the upper frame and the lift boom is extended and retracted to raise and lower the lift boom, and an extension cylinder connected between the lift boom and the stick boom is extended and retracted to pivot the stick boom away from and back toward the lift boom. An additional implement cylinder connected between the stick boom and the implement, perhaps by an intermediate linkage connection, extends and retracts to move the implement relative to the stick boom. The components act together under the control of the operator to move the implement through a range of motion defined by the movements of the components to allow the implement to perform the material handling functions for which the work machine is designed.

Multi-component linkages such as that described above are implemented in many different work machines performing a variety of material handling functions. For example, multi-component linkages are implemented in backhoe loaders, material handlers, skidders, wheeled and tracked excavators, telehandlers, forwarders, forest machines, tracked feller bunchers, knuckle boom loaders, wheeled and tracked harvesters, and the like. In forestry work machines, such as, for example, feller bunchers, the multi-component linkages provide versatility in manipulating the implement that is necessary to effectively operate the work machines in diverse conditions that may be encountered at job sites. A feller buncher includes an implement that rapidly cuts and gathers several trees before felling them. The tree-grabbing implement of the feller buncher is provided with a chain-saw, circular saw or shearing/pinching device designed to cut trees off at the base. The tree-grabbing implement is then manipulated to place the cut tree(s) on a stack suitable for a skidder, forwarder or other work machine to transport the trees for further processing.

In known feller bunchers, the operator uses controls for the lift cylinder, the stick cylinder and the implement cylinder to orient the implement and move the implement to a tree to be cut down. When the feller buncher is operated on a generally horizontal grade at the work site, the operator manipulates all three controls to position the implement close to the ground, and then extend the lift boom and stick boom to move the implement parallel to the ground and into engagement with tree. Control of the feller buncher on a sloped grade is more difficult for the operator. When, for example, the feller buncher is facing uphill, the operator can operate the controls to move the implement upward parallel to the sloped surface in a similar manner as with the flat surface. This allows the operator to move the implement in a similar manner regardless of the slope on which the feller buncher is disposed. However, cutting upwardly into the tree can result in pinch points on the saw blade as the weight of the tree rotates back toward the feller buncher. The pinching can be reduced or eliminated by orienting and moving the tree-grabbing implement horizontally with respect to gravity to the tree instead of parallel to the ground. However, manipulating three controls to produce the horizontal movement of the implement on a sloped grade and maintaining the orientation of the implement is more difficult for the operator to execute, and extended periods of attempting to control the movement can be more fatiguing to the operator.

Feller bunchers and other types of work machines with multi-component linkages have been developed to assist the operators in creating specified movements of the linkages and implements, and to adapt to operation on sloped surfaces as described above. For example, U.S. Pat. No. 6,443,196, issued to Kurelek on Sep. 3, 2002 and entitled, "Hydraulic Circuits for Tree-Harvesting Knuckle Booms," discloses two boom members and hydraulic cylinders of a knuckle boom tree harvesting machine arranged and proportioned so that with a single control movement during reaching and retracting actions, the working tool head is made to travel in an approximately horizontal path. The cylinder diameters and strokes are dimensioned and control valve is so connected to the cylinders that during the horizontal reaching action load-supporting pressurized oil from a collapsing cylinder is not required to be drained to the reservoir in the conventional heat generating manner, but is rather shunted directly to an extending cylinder where it continues to do useful load support work. An additional reach cylinder is provided to between the hoist boom and stick boom to alter or hold the angle between the booms. Consequently, additional components are required to implement the hydraulic circuits. Moreover, the publication does not discuss the reaching and retracting actions provided by the hydraulic circuit arrangement when the knuckle boom harvesting machine is used on a sloped grade.

Another example of a modified forestry machine is provided in U.S. Pat. No. 8,180,532, issued to O'Halloran et al. on May 15, 2012 and entitled, "Vector Controlled Leveling System for a Forestry Machine." The O'Halloran et al. reference discloses a leveling control system for a forestry machine employing position sensors that relay information about the orientation of the carriage in relation to the swing-house assembly in order to control roll and pitch in a manner that maximizes the operating envelop of the leveling mechanism. The angles of pitch and roll of the swing-house assembly in relation to the carriage are measured and/or calculated and a controller limits operation of the leveling mechanism to an operating envelop that may be described in terms of pitch and roll. The swing-house assembly orientation cylinders are decelerated gradually as the operating envelope is approached. The controller can include an automatic leveling mode. The controller can change the function of the fore, aft, left and right operator controls so that they are true from the operator's frame of reference regardless of the rotary position of the cab relative to the carriage. With this arrangement, the leveling system is operated to level the swing-house assembly as the carriage traverses uneven or sloping terrain. The leveling allows the operator to cause the implement to move horizontally on all surfaces using essentially the same operator control manipulations. However, as with the Kurelek reference, additional mechanical and hydraulic components are required in the design, adding to the complexity and failure modes for the work machine.

In view of the reconfiguration of existing work machines to implement the designs disclosed in the references, a need exists for a multi-component linkage and implement tracking mechanism for determining a sloped grade on which the work machine is operating and to causing the linkage to move the implement horizontally or vertically regardless of the slope of the surface over which the work machine is operating, and to maintain a prescribed orientation of the implement as it moves.

SUMMARY OF THE DISCLOSURE

In one aspect of the present disclosure, a work machine is described. The work machine includes a frame, a lift boom having a first end and an oppositely disposed second end, with the first end of the lift boom pivotally connected to the frame by a first pivot pin, a stick boom having a first end and an oppositely disposed second end, with the first end of the stick boom pivotally connected to the second end of the lift boom by a second pivot pin, and an implement pivotally connected to the second end of the stick boom by a third pivot pin. The work machine further includes a lift boom actuation mechanism operatively connected to the lift boom and operable to pivot the lift boom about the first pivot pin relative to the frame, a stick boom actuation mechanism operatively connected to the stick boom and operable to pivot the stick boom about the second pivot pin relative to the lift boom, a first operator control configured to transmit motion command signals, and a controller operatively connected to the lift boom actuation mechanism, the stick boom actuation mechanism and the first operator control. The controller is configured to determine a current position of the third pivot pin relative to the first pivot pin based on a first lift boom orientation angle and a first stick boom orientation angle, to detect the motion command signals from the first operator control, to determine an ending position of the third pivot pin relative to the first pivot pin in response to detecting the motion command signals, and to actuate the lift boom actuation mechanism to rotate the lift boom to a second lift boom orientation angle and the stick boom actuation mechanism to rotate the stick boom to a second stick boom orientation angle to move the third pivot pin from the current position to the ending position.

In another aspect of the present disclosure, a method for positioning an implement of a work machine is described. The work machine includes a frame, a lift boom having a first end and an oppositely disposed second end, with the first end of the lift boom pivotally connected to the frame by a first pivot pin, a stick boom having a first end and an oppositely disposed second end, with the first end of the stick boom pivotally connected to the second end of the lift boom by a second pivot pin, and the implement is pivotally connected to the second end of the stick boom by a third pivot pin. The positioning method includes determining a current position of the third pivot pin relative to the first pivot pin based on a first lift boom orientation angle and a first stick boom orientation angle, detecting a motion command signal from an operator control, determining an ending position of the third pivot pin relative to the first pivot pin in response to detecting the motion command signal, and moving the lift boom to a second lift boom orientation angle and the stick boom to a second stick boom orientation angle to move the third pivot pin from the current position to the ending position.

In a further aspect of the present disclosure, a work machine is described. The work machine includes a frame, a boom having a first end and an oppositely disposed second end, with the first end of the boom operatively connected to the frame for movement relative to the frame that includes rotational motion, an implement pivotally connected to the second end of the boom by a pivot pin, an implement actuation mechanism operatively connected to the implement and operable to pivot the implement about the pivot pin relative to the boom, and a controller operatively connected to the implement actuation mechanism. The controller is configured to determine a current implement orientation angle of the implement, to compare the current implement orientation angle of the implement to a target orientation angle, and to actuate the implement actuation mechanism to rotate the implement about the pivot pin toward the target orientation angle in response to determining that the current implement orientation angle is not equal to the target orientation angle.

Additional aspects are defined by the claims of this patent.

DETAILED DESCRIPTION

Although the following text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

Figure 1:
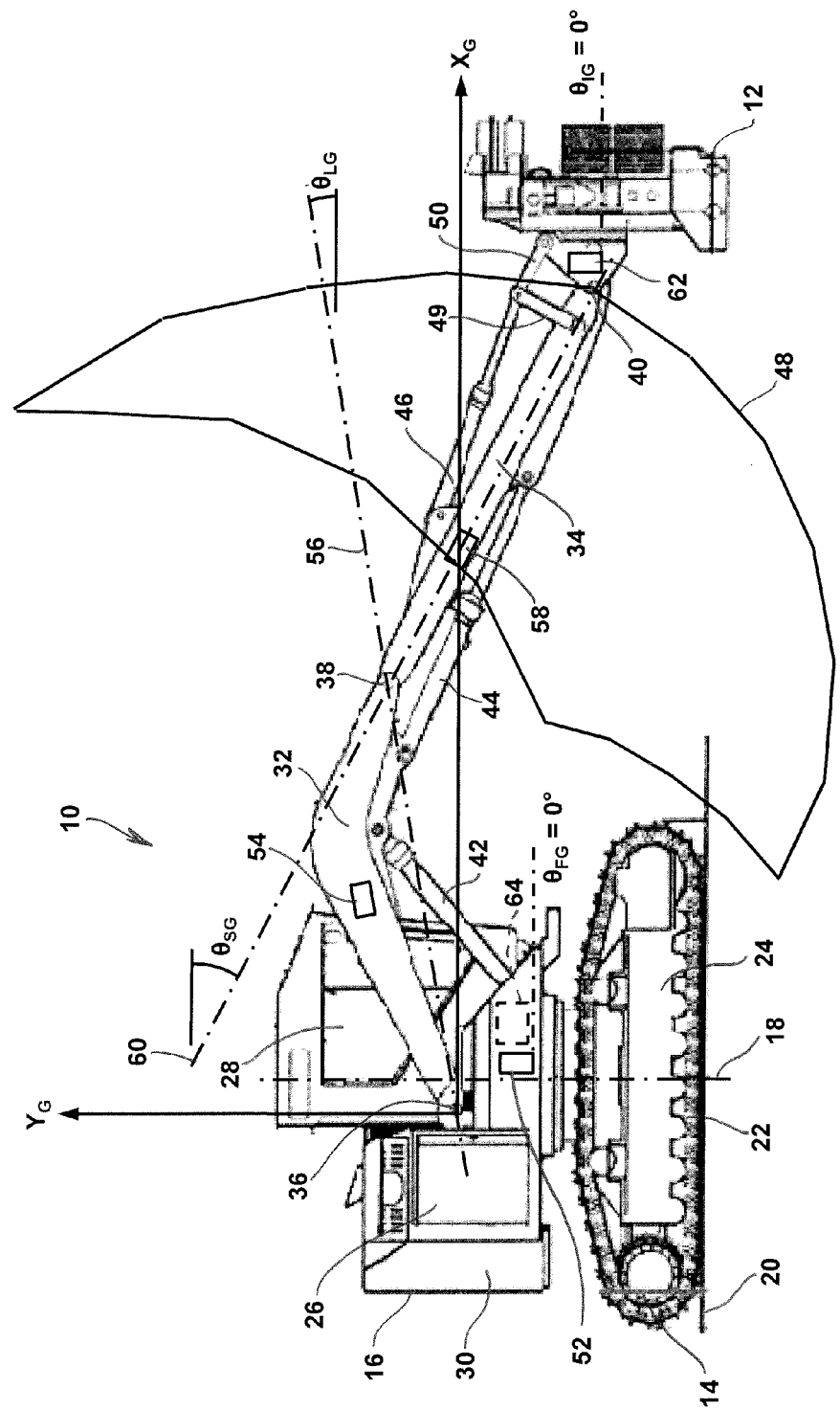
FIG. 1 is a side view of a work machine having a multi-component linkage for manipulating an implement and configured for implement tracking in accordance with the present disclosure.

FIG. 1 is an illustration of an exemplary work machine 10 in the form of a tracked feller buncher having a multi-component linkage for positioning and manipulating an end effecter or other type of implement 12. The implement 12 in the present example is a fixed processor head capable of cutting and gathering several trees before felling the trees. Although the work machine 10 is depicted in the figures as a tracked feller buncher, the presently disclosed linkage control and implement tracking system may be used on any kind of work machine having a multi-component linkage for positioning and manipulating an implement 12, and other types of implements 12 may be attached at the end of the linkage and similarly positioned and manipulated.

The work machine 10 includes an undercarriage 14 having an upper frame 16 rotatably mounted thereon for rotation about an upper frame axis 18 that is approximately perpendicular to a work surface 20 on which the work machine 10 is disposed. The undercarriage 14 includes tracks 22 mounted on a carriage frame 24 that engage the work surface 20 over which the work machine 10 travels when a power source 26, such as an internal combustion engine or a motor, propels the work machine 10. The drive mechanism formed by the tracks 22 of the undercarriage 14 and the power source 26, and a rotational mechanism converting power output by the power source 26 to rotation of the upper frame 16, are conventional and may be any suitable type for work machines having multi-component linkages as described herein including, for example, substitution of wheels for the undercarriage 14 and tracks 22.

The upper frame 16, in addition to housing the power source 26, includes an operator station 28 in which the operator of the work machine 10 sits and controls the operation of the work machine 10 via operator controls located within the operator station 28. The upper frame 16 may further include a counterweight 30 disposed at a rearward area of the upper frame 16 to counterbalance the forces created as the implement 12 is extended and acquires loads of work material. The multi-component linkage extends from the upper frame 16 and includes at least one lift boom 32 and at least one stick boom 34. Depending on the requirements for the work machine 10, two or more lift booms 32 may be used with one or more stick booms 34, such as where greater loads are anticipated and additional support structure is required. However, the multiple lift booms 32 and/or multiple stick booms 34 each function together as a single kinematic component of the multi-component linkage for purposes of the following discussion. Consequently, it will be understood that discussion of a singular lift boom 32 or singular stick boom 34 encompasses work machines 10 having multiple lift booms 32 and/or stick booms 34.

One end of the lift boom 32 is pivotally connected to the upper frame 16 by a frame-lift boom pivot pin 36 and the opposite end of the lift boom 32 is pivotally connected to one end of the stick boom 34 by a lift-stick pivot pin 38. The implement 12 is pivotally connected to the other end of the stick boom 34, either directly or by a coupling mechanism, at a stick-implement pivot pin 40. The lift boom 32 is rotated about the pivot pin 36 by at least one lift cylinder 42 that is pivotally connected between upper frame 16 and the lift boom 32 at an effective angle relative to the lift boom 32. The lift cylinder 42 extends to rotate the lift boom 32 upwardly and raise the stick boom 34 and, correspondingly, the implement 12, and retracts to rotate the lift boom 32 downwardly and lower the stick boom 34 and implement 12. The stick boom 34 is rotated about the pivot pin 38 by at least one stick cylinder 44 that is pivotally connected between the lift boom 32 and the stick boom 34 at an effective angle relative to the stick boom 34. The stick cylinder 44 extends to rotate the stick boom 34 away from the lift boom 32, and retracts to rotate the stick boom 34 toward the lift boom 32. The lengths of the lift boom 32 and the stick boom 34, and the limiting extended and retracted positions of the lift cylinder 42 and the stick cylinder 44, will define an operating range 48 of positions to which the pivot pin 40 may be moved.

In most implementations, it is desired to provide the operator with control to rotate the implement 12 relative to the stick boom 34 to perform the work for which the implement is designed. For example, it is necessary to keep the illustrated fixed processor head 12 oriented as shown in FIG. 1 or tilted slightly forward as the lift boom 32 and stick boom 34 extend the implement 12 toward the trees. A tilt cylinder 46 is connected between the stick boom 34 and the implement 12 or its coupling device to control of the angle of the implement 12 relative to the stick boom 34. The tilt cylinder 46 is pivotally connected to the stick boom 34, and acts on the implement 12 by a direct pivoted connection where the required range of pivotal motion of the implement is limited, or through a linkage such as that formed by a crank 49 and link 50 as shown in FIG. 1 to achieve a greater tilt angle range for the implement 12. The tilt cylinder 46 extends to rotate the implement 12 clockwise as shown away from the stick boom 34, and retracts to rotate the implement counterclockwise toward the stick boom 34. While cylinders 42, 44, 46 are used in the illustrated examples of the work machine 10 provided herein to cause movement of the lift boom 32, the stick boom 34 and the implement 12, those skilled in the art will understand that any actuation mechanism for causing rotation of the booms 32, 34 and the implement 12 about the relevant pivot pin may be implemented in a work machine, such as electrical or robotic arms, drive motors and the like. The use of such actuation mechanisms and control of the mechanisms by the implement tracking and orientation routines as described hereinafter are contemplated by the inventors.

The presently disclosed linkage control and implement tracking system has its foundation in determining the orientations of the relevant kinematic elements of the work machine 10, and using the orientations of the kinematic elements to move the implement 12 horizontally or vertically regardless of the orientation of the upper frame 16 and undercarriage 14 of the work machine 10 as dictated by the slope of the work surface 20 on which the work machine 10 operates. In the present application, the relevant kinematic elements are the upper frame 16, the lift boom 32, the stick boom 34 and the implement 12. The orientations of these kinematic elements may be provided by appropriate orientation sensors, such as inclinometers, mounted on the kinematic elements and capable of determining relative orientations of the kinematic elements with respect to defined reference lines, such as horizontal or vertical lines. Other types of orientation sensors or alternative mechanisms for determining the orientations or positions of the kinematic elements with respect to gravity or other appropriate reference may be implemented in the work machine 10. Devices such as displacement sensors on the cylinders 42, 44, 46, laser sensors and the like may be used to determine the relative orientations or positions of the upper frame 16, the lift boom 32, the stick boom 34 and the implement 12 may be used and the control routines described hereinafter configured to interpret control signals transmitted by the devices to execute the tracking and orientation control strategies.

A first orientation sensor or upper frame inclinometer 52 is mounted on a rigid part of the upper frame 16 and provides a first orientation sensor signal having a value indicative of an orientation angle $\theta_{FG}$ of the upper frame 16 relative to a gravity coordinate system having a horizontal axis $X_G$ and a vertical axis $Y_G$ with respect to gravity. For clarity and kinematic relevance, an origin of the gravity coordinate system is located at the frame-lift boom pivot pin 36. A second orientation sensor or lift boom inclinometer 54 is mounted on the lift boom 32 and provides a second orientation sensor signal having a value indicative of an orientation angle $\theta_{LG}$ of a lift boom centerline 56 passing through the pivot pins 36, 38 relative to the axis $X_G$. A third orientation sensor or stick boom inclinometer 58 is mounted on the stick boom 34 and provides a third orientation sensor signal having a value indicative of an orientation angle $\theta_{SG}$ of a stick boom centerline 60 passing through the pivot pins 38, 40 relative to the axis $X_G$. Finally, a fourth orientation sensor or implement inclinometer 62 is mounted on the implement 12 or the coupling mechanism and provides a fourth orientation sensor signal having a value indicative of an orientation angle $\theta_{IG}$ of the implement 12 relative to the axis $X_G$. In some implementations, the implement inclinometer 62 may be omitted or its signal ignored where the implement 12 is a dangling attachment such as a dangling head of a harvester linkage, tongs, a clamshell bucket and the like were the orientation of the implement 12 is not controlled. For some kinematic elements having irregular shapes such as the curved lift boom 32 illustrated in FIG. 1, it may not be possible to mount the orientation sensor on the kinematically-relevant reference line of the element. For such elements, the orientation sensor may be mounted at any appropriate location on the element and oriented properly with the reference line to provide a sensor signal value indicative of the orientation of the reference line.

Figure 2:
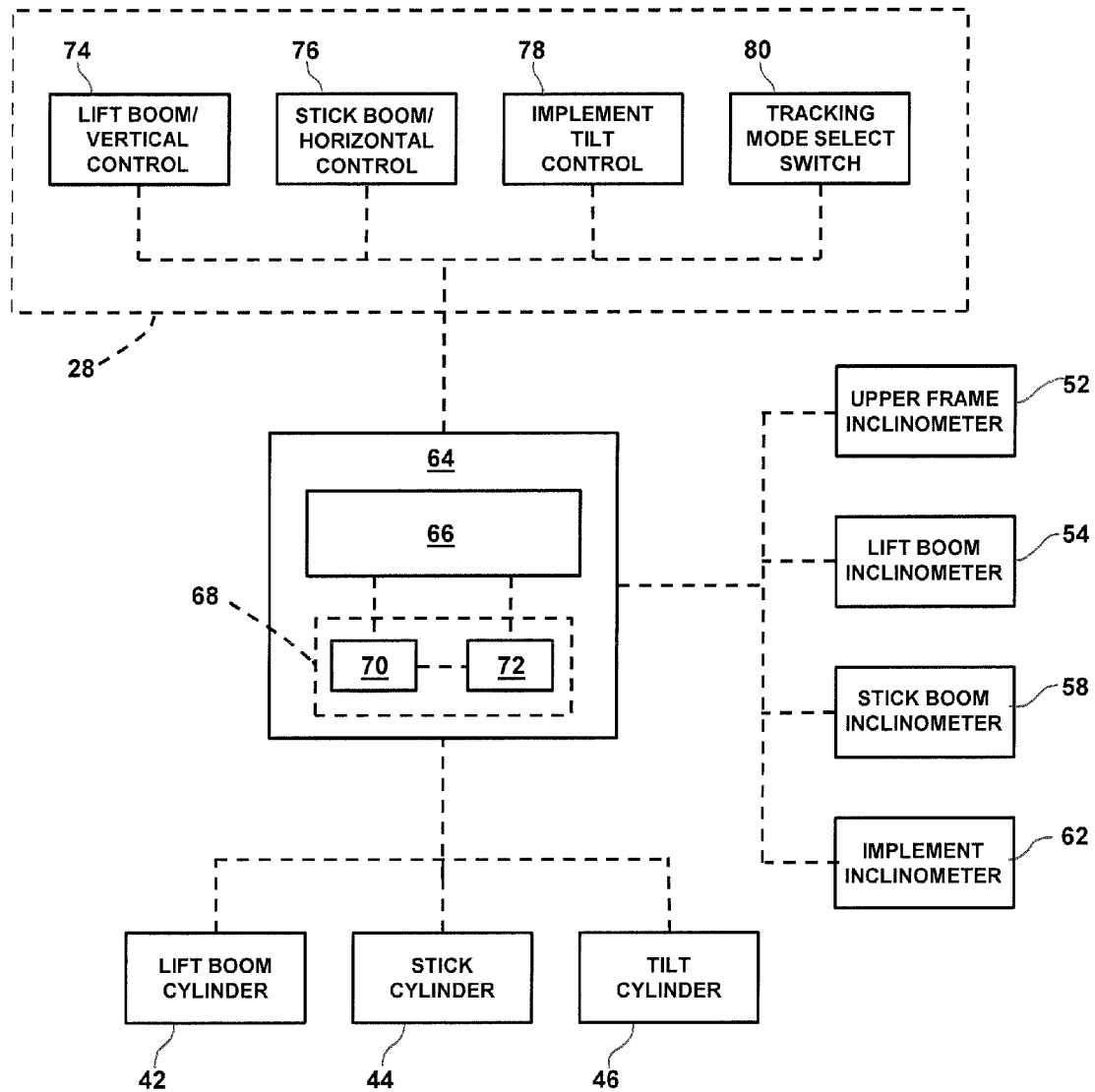
FIG. 2 is a schematic view of the components of the work machine of FIG. 1 for operating the linkage and tracking the implement in accordance with the present disclosure.

The inclinometers 52, 54, 58, 62, along with other control elements of the work machine 10, are operatively connected to a controller 64, such as an electronic control module (ECM), located at the upper frame 16. Referring now to FIG. 2, the control elements operable to track and control the operation of the linkage are illustrated schematically. As discussed above, the controller 64 resides in the upper frame 16 of the work machine 10. The controller 64 includes a microprocessor 66 for executing a specified program, which controls and monitors various functions associated with the work machine 10. The microprocessor 66 includes a memory 68, such as ROM (read only memory) 70, for storing a program or programs, and a RAM (random access memory) 72 which serves as a working memory area for use in executing the program(s) stored in the memory 68. Although the microprocessor 66 is shown, it is also possible and contemplated to use other electronic components such as a microcontroller, an ASIC (application specific integrated circuit) chip, or any other integrated circuit device.

The controller 64 electrically connects to the inclinometers 52, 54, 58, 62 to receive the orientation sensor signals indicating the orientations of the upper frame 16, the lift boom 32, the stick boom 34 and the implement 12, respectively. The controller 64 is also electrically connected to the operator controls disposed in the operator station 28. The operator controls include, among others, a lift boom/vertical control 74, a stick boom/horizontal control 76, an implement tilt control 78 and a tracking mode select switch 80. The controller 64 is further electrically connected to controlled devices of the work machine 10. Relevant to the present disclosure, the controlled devices include control valves of the lift cylinder 42, the stick cylinder 44 and the tilt cylinder 46. As the operator manipulates the controls 74, 76, 78, 80, control signals are transmitted to the controller 64 to communicate the motion of the lift boom 32, stick boom 34 and implement 12 commanded by the operator. Upon receiving the control signals from the controls, the controller 64 determines the corresponding extension or retraction required of the cylinders 42, 44, 46. The controller 64 then transmits control signals to the control valves of one or more of the cylinders 42, 44, 46 as necessary to perform the commanded movement of the lift boom 32, the stick boom 34 and/or the implement 12.

INDUSTRIAL APPLICABILITY

In the standard operating mode, the operator must manipulate the lift boom control 74, the stick boom control 76 and the implement tilt control 78 to operate the control valves of the lift cylinder 42, the stick cylinder 44 and the tilt cylinder 46, respectively, to position and orient the implement 12. The lift cylinder 42 and the stick cylinder 44 extend and contract as commanded to change the angles $\theta_{LG}$, $\theta_{SG}$ and position the stick-implement pivot pin 40 relative to the upper frame 16 within the gravity coordinate system at a position $X_G$, $Y_G$ (FIG. 1) relative to the frame-lift boom pivot pin 36. The tilt cylinder 46 rotates the implement 12 about the pivot pin 40 to change the angle $\theta_{IG}$. Skilled operators can deftly maneuver the lift boom 32, the stick boom 34 and the implement 12 to perform most tasks of the work machine 10. However, it is quite difficult and fatiguing to move the implement 12 in a straight line while maintaining the implement 12 at a constant orientation angle $\theta_{IG}$. Such movements require precise simultaneous manipulation of all three controls 74, 76, 78 in known work machines.

In the work machine 10 in accordance with the present disclosure, control of the lift cylinder 42, the stick cylinder 44 and the tilt cylinder 46 to move the implement 12 along a generally linear path while maintaining a prescribed orientation of the implement 12 is accomplished by an implement tracking control strategy. Under the control strategy, the lift boom control 74 and the stick boom control 76 are converted into a vertical control and a horizontal control, respectively, whereby the control signals from the controls 74, 76 are interpreted by the controller 64 as vertical and horizontal rates of change of the position of the stick-implement pivot pin 40. If only the lift boom control 74 transmits signals, the controller 64 controls the cylinders 42, 44 to move the pivot pin 40 up or down parallel to the axis $Y_G$. If only the stick boom control 76 transmits signals, the pivot pin 40 and implement 12 move horizontally parallel to the axis $X_G$. If both controls 74, 76 are actuated, the pivot pin 40 and the implement 12 move along a generally straight diagonal line if the controls 74, 76 are held in position. As will be explained further, the frame orientation angle $\theta_{FG}$ is taken into account by the controller 64 so that the implement 12 moves in a similar manner with respect to the gravity coordinate system when the work machine 10 is operating on a sloped surface. Through all the movements, the controller 64 actuates the tilt cylinder 46 to maintain the implement 12 at a prescribed orientation with respect to the gravity coordinate system.

Figure 3:
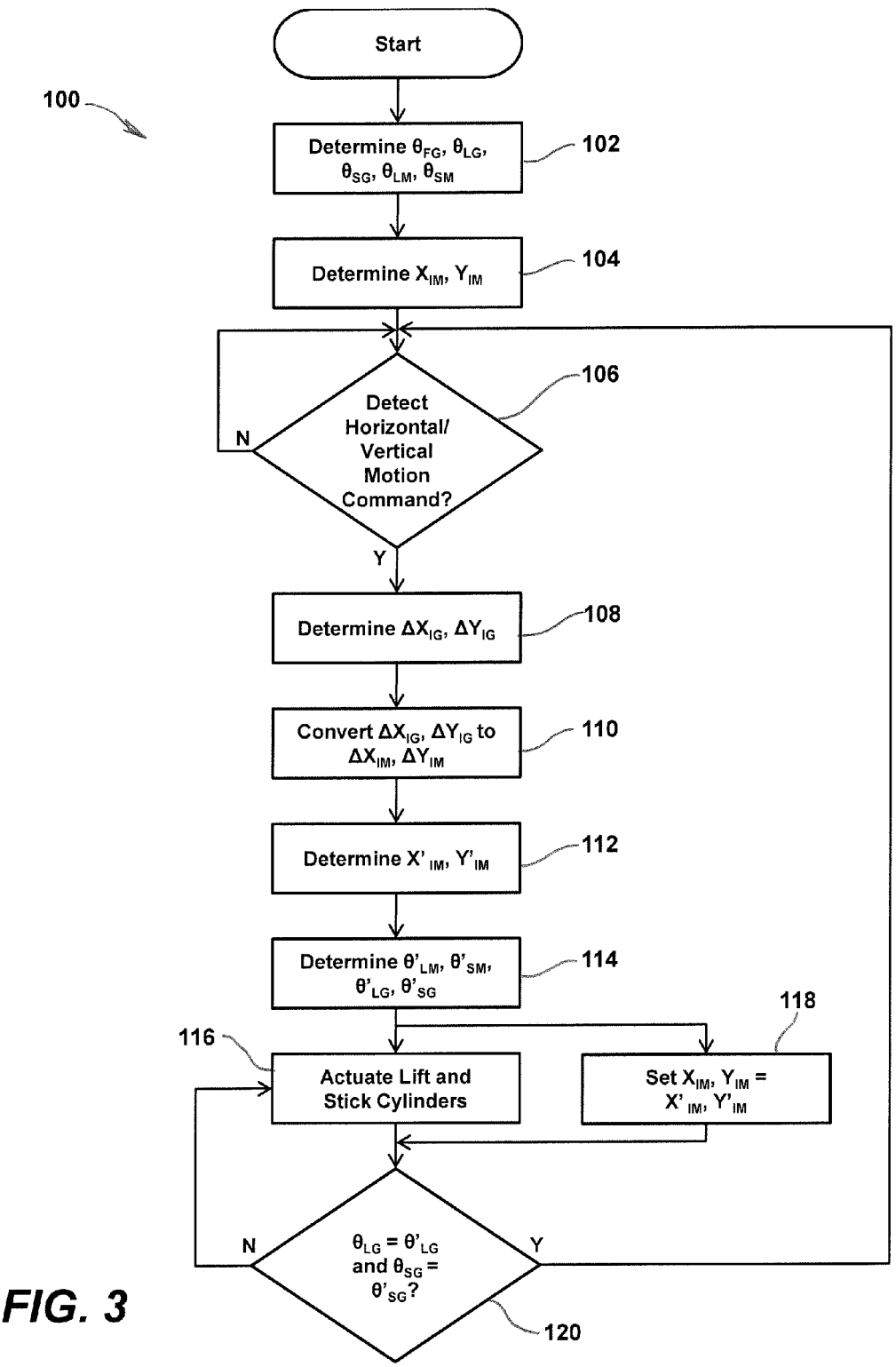
FIG. 3 is a flow diagram of an implement tracking routine in accordance with the present disclosure for the work machine of FIG. 1.

FIG. 3 illustrates an embodiment of an implement tracking routine 100 and accordance with the present disclosure implemented in the controller 64. When in a normal operational mode and not under control of the routine 100, the operator manipulates the controls 74, 76, 78 in a conventional manner to position and orient the implement 12. In the case of the feller buncher 10 illustrated in FIG. 4, the work machine 10 may be positioned near a tree 122 with the implement 12 retracted to a position proximate the work machine 10 and having an orientation angle $\theta_{IG}$ approximately equal to zero. With the implement 12 positioned, it is desirable to move the implement horizontally to the tree 122. The operator initiates the implement tracking routine 100 of FIG. 3 by actuating the tracking mode select switch 80 to transmit a signal to the controller 64 to enter the tracking mode by executing the routine 100 to control the cylinders 42, 44.

Figure 4:
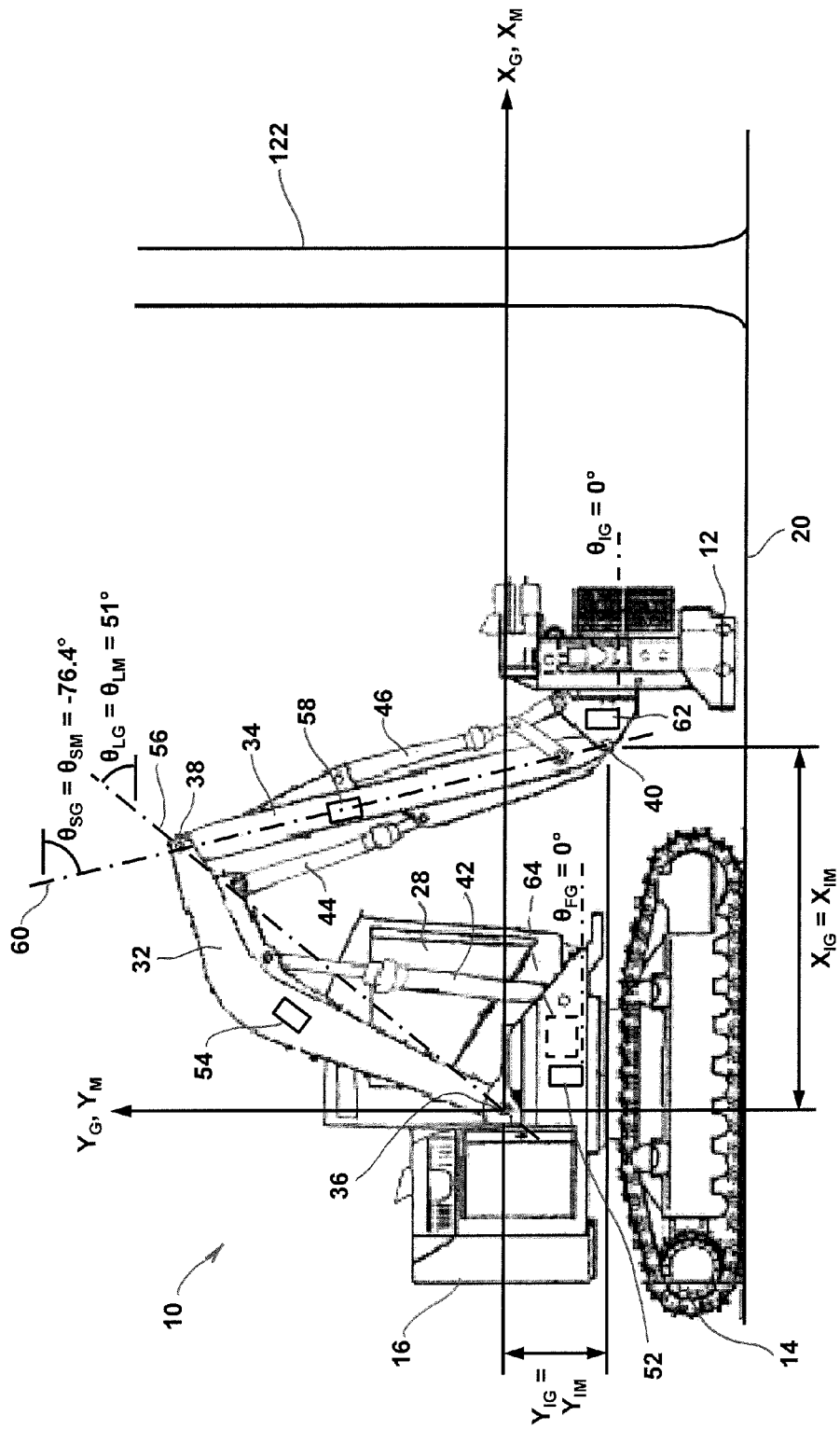
FIG. 4 is a side view of the work machine of FIG. 1 on a flat portion of a work surface and with the linkage retracted toward the work machine.
Figure 5:
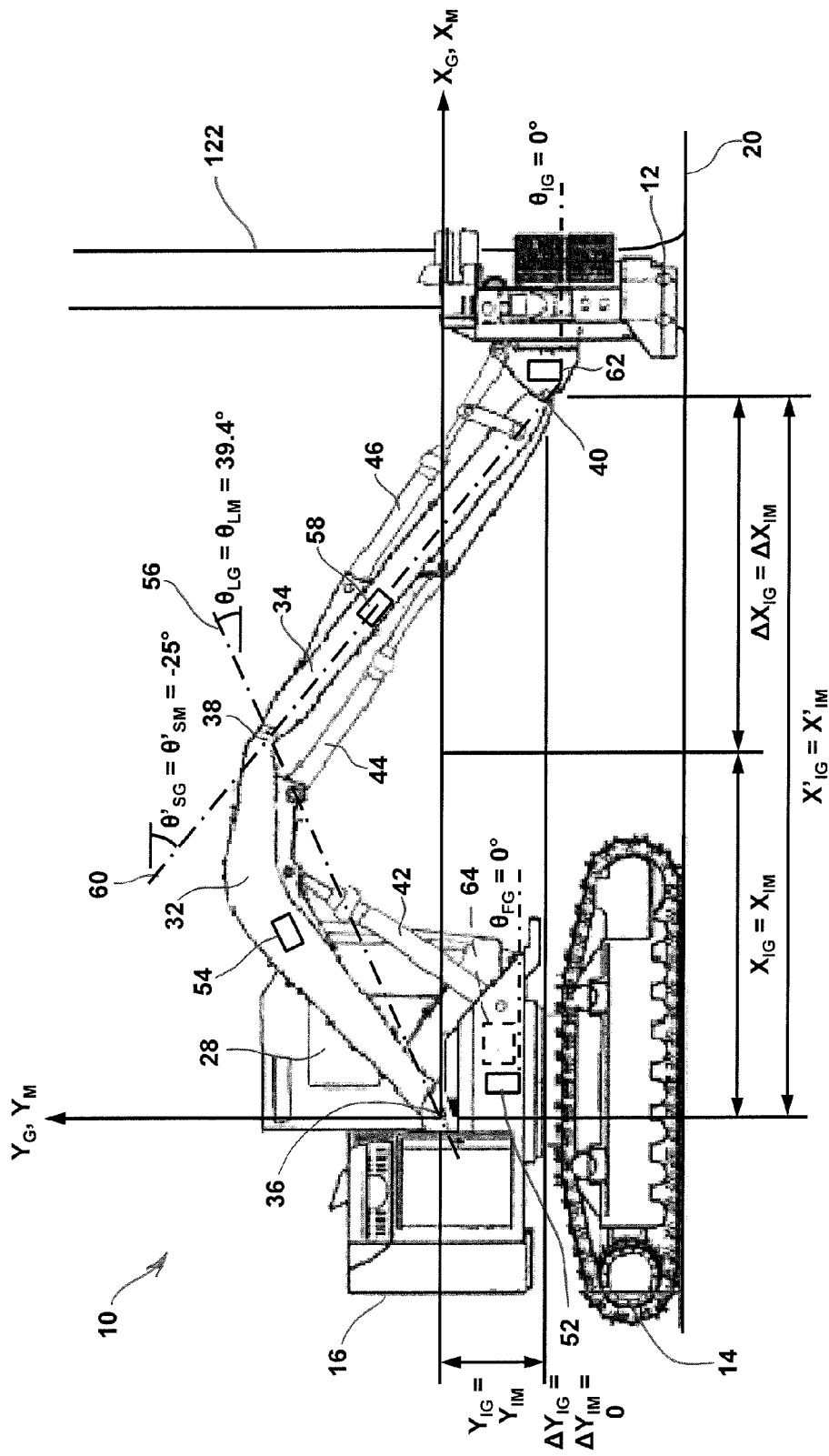
FIG. 5 is a side view of the work machine of FIG. 1 on a flat portion of a work surface and with the linkage extended horizontally away from the work machine.

Upon receiving the signal from the tracking mode select switch 80, the controller 64 passes control to a block 102 to determine the values of the angles $\theta_{FG}$, $\theta_{LG}$, $\theta_{SG}$, $\theta_{IG}$ in the gravity coordinate system, and the values of the angles $\theta_{LM}$, $\theta_{SM}$ in a machine coordinate system. The values of the angles $\theta_{FG}$, $\theta_{LG}$, $\theta_{SG}$, $\theta_{IG}$ are obtained from the orientation sensor signals from the inclinometers 52, 54, 58, 62, respectively. In the example of FIGS. 4 and 5, the work machine 10 is operating on level ground. Consequently, the orientation sensor signal from the upper frame inclinometer 52 indicates that the angle $\theta_{FG}$ is zero with respect to gravity. With the implement 12 in the upright tree felling orientation is shown, the orientation sensor signal from the implement inclinometer 62 indicates that the angle $\theta_{IG}$ is equal to zero. The orientation sensor signals from the inclinometers 54, 58 indicate that the lift boom centerline 56 is oriented with the angle $\theta_{LG}$ approximately equal to 51° and that the stick boom centerline 60 is oriented with the angle $\theta_{SG}$ approximately equal to −76.4°, respectively.

While the inclinometers 52, 54, 58, 62 provide angles with respect to the gravity coordinate system, the controller 64 operates the cylinders 42, 44 to position the lift boom 32 and stick boom 34 relative to the frame of reference of the work machine 10 regardless of any slope or undulation in the work surface 20 that may reorient the upper frame 16 a result in the frame orientation angle $\theta_{FG}$ being greater than or less than zero. Consequently, the angles $\theta_{LG}$, $\theta_{SG}$ must be converted to angles $\theta_{LM}$, $\theta_{SM}$ in a machine coordinate system so that the controller 64 can cause the lift cylinder 42 and the stick cylinder 44 to move in the machine coordinate system to create the motion commanded by the operator in the gravity coordinate system. The angles $\theta_{LG}$, $\theta_{SG}$ are converted by subtracting the angle $\theta_{FG}$:

$$\theta_{LM} = \theta_{LG} - \theta_{FG} \quad (1)$$

$$\theta_{SM} = \theta_{SG} - \theta_{FG} \quad (2)$$

In the example of FIG. 4, with the angle $\theta_{FG}$ equal to zero, the machine coordinate system is aligned with the gravity coordinate system, and the machine axes $X_M$, $Y_M$ are coincident with the gravity axes $X_G$, $Y_G$. As a result, $\theta_{LM} = \theta_{LG} = 51°$ and $\theta_{SM} = \theta_{SG} = -76.4°$. An example where the work machine 10 operates on a slope and the coordinate systems are not aligned is provided below.

After the lift boom and stick boom angles $\theta_{LM}$, $\theta_{SM}$ are determined, control passes to a block 104 where the controller 64 determines the coordinates $X_{IM}$, $Y_{IM}$ of the stick-implement pivot pin 40 in the machine coordinate system. With the origin positioned at the pivot pin 36, the coordinates of the pivot pin 40 are determined by the following formulas:

$$X_{IM} = L_L \cos\theta_{LM} + L_S \cos\theta_{SM} \quad (3)$$

$$Y_{IM} = L_L \sin\theta_{LM} + L_S \sin\theta_{SM} \quad (4)$$

where $L_L$ is the lift boom link length from pivot pin 36 to pivot pin 38, and $L_S$ is the stick boom link length from pivot pin 38 to pivot pin 40. In the exemplary work machine 10, the link length $L_L$=325 cm (128 inches) and the link length $L_S$=343 cm (135 inches), and equations (3) and (4) yield starting coordinates of the pivot pin 40 of $X_{IM}$=284 cm (111.8 inches) and $Y_{IM}$=−80.8 cm (−31.81 inches).

The controller 64 may be programmed to perform the calculations of equations (3) and (4). Alternatively, processing resources of the controller 64 may be conserved by providing a look-up table or tables containing values of the coordinates $X_{IM}$, $Y_{IM}$ for all possible combinations of the lift boom angle $\theta_{LM}$ and stick boom angles $\theta_{SM}$. In this case, the controller 64 inputs the values of the angles $\theta_{LM}$, $\theta_{SM}$ from equations (1) and (2) and the look-up table(s) return(s) the values of the starting coordinates $X_{IM}$, $Y_{IM}$ will be calculated using the equations (3) and (4).

Once the starting coordinates $X_{IM}$, $Y_{IM}$ of the stick-implement pivot pin 40 is determined at the block 104, the controller 64 can respond to manipulation of the vertical control 74 and the horizontal control 76 to move the pivot pin 40. Deflection or displacement of the controls 74, 76 causes motion command signals to be transmitted to the controller 64. When not in the tracking mode, command signals from the lift boom control 74 cause the controller 64 to operate only the control valve of the lift cylinder 42, and command signals from the stick boom control 76 cause the controller to operate only the control valve of the stick cylinder 44. In the tracking mode, command signals from one of the controls 74, 76, 78, such as from the lift boom control 74, may be interpreted by the controller 64 as commanding vertical motion achieved by control of both cylinder 42, 44. Similarly, command signals from another one of the controls 74, 76, 78, such as from the stick boom control 76, may be interpreted as commanding horizontal motion achieved by control of both cylinders 42, 44. Control of the routine 100 passes to a block 106 where the controller 64 evaluates whether a vertical motion command is being transmitted by the vertical control 74, a horizontal motion command is being transmitted by the horizontal control 76, or both. In an alternate configuration, a single control in the form of a joystick or other multi-directional operator input device may be used to provide commands for both the horizontal motion and the vertical motion of the pivot pin 40. Deflecting the joystick forward or rearward may generate horizontal motion command signals, and deflecting the joystick left and right may generate vertical motion command signals. Deflecting the joystick toward an intermediate direction may generate motion command signals for the pivot pin 40 move with both horizontal and vertical motions components.

If no motion command signals are detected by the controller 64, neither vertical nor horizontal motion is being commanded and control passes back to the block 106 to continue checking for the command signals at a predetermined sampling rate SR, such as 10 ms. When a motion command signal is detected by the controller 64 at the block 106, control passes to a block 108 to determine the corresponding horizontal position change $\Delta X_{IG}$, vertical position change $\theta Y_{IG}$, or both, commanded by the operator. The amount of the displacement of the controls 74, 76 determines how fast the operator wants to move the pivot pin 40. The greater the displacement, the faster the pivot pin 40 should move. In the tracking mode, the controller 64 is programmed to convert the value of the command signals from the horizontal control 76 into a time rate of change $V_{XG}$ along the horizontal axis $X_G$, and command signals from the vertical control 74 into a time rate of change $V_{YG}$ along the vertical axis $Y_G$. The time rates of change $V_{XG}$, $V_{YG}$ are multiplied by the sampling rate (SR) to determine the position changes $\Delta X_{IG}$, $\Delta Y_{IG}$ commanded to occur during the sample period as follows:

$$\Delta X_{IG} = V_{XG} \times SR \quad (5)$$

$$\Delta Y_{IG} = V_{YG} \times SR \quad (6)$$

It will be apparent that the values of the time rates of change $V_{XG}$, $V_{YG}$ will be zero when the horizontal control 76 and the vertical control 74, respectively, are in their neutral positions. In the present example, the horizontal control 76 is displaced by the operator to move the pivot pin 40 horizontally toward the tree 122, and the vertical control 74 is in the neutral position. Also, during normal implementations, the sample rate SR will be much less than one sample per second and a relatively small movement of the pivot pin 40 will occur during the sample period. For purposes of illustration and visual relevance, the larger position change for the full travel of the pivot pin 40 to the tree 122 is used in the present example. Consequently, the horizontal position change $\Delta X_{IG}$ is approximately 274 cm (approximately 107.9 inches) and the vertical position change $\Delta Y_{IG}$ is zero as indicated in FIG. 5.

After determining the position changes $\Delta X_{IG}$, $\Delta Y_{IG}$, the changes in the global coordinate system must be converted to corresponding changes in the machine coordinate system in order to properly control the lift cylinder 42 and the stick cylinder 44. Control passes to a block 110 to perform the conversion. The conversion is performed by the controller 64 using the following equations derived from the two-dimensional rotation matrix:

$$\Delta X_{IM} = \Delta X_{IG} \cos \theta_{FG} + \Delta Y_{IG} \sin \theta_{FG} \quad (7)$$

$$\Delta Y_{IM} = -\Delta X_{IG} \sin \theta_{FG} + \Delta Y_{IG} \cos \theta_{FG} \quad (8)$$

The rotation matrix equations for a negative value of the frame angle $\theta_{FG}$ are used to reflect a clockwise rotation in the machine coordinate system to arrive at the commanded position of the pivot pin 40 as will be more apparent in the second example provided below. Where the work machine 10 is on level ground is shown with the frame angle $\theta_{FG}$ equal to zero, the machine coordinate system position change $\Delta X_{IM}$ along the axis $X_M$ is equal to the horizontal position change $\Delta X_{IG}$ (270 cm (106.3 inches)) along the axis $X_G$ and the machine coordinate system position change $\Delta Y_{IM}$ along the axis $Y_M$ is equal to the vertical position change $\Delta Y_{IG}$ (0 cm (0 inch)) along the axis $Y_G$.

With the gravity coordinate system position changes $\Delta X_{IG}$, $\Delta Y_{IG}$ converted to the position changes $\Delta X_{IM}$, $\Delta Y_{IM}$ in the machine coordinate system, control passes to a block 112 to determine the ending coordinates $X'_{IM}$, $Y'_{IM}$ of the pivot pin 40 in the machine coordinate system at the end of the sample period. The ending coordinates $X'_{IM}$, $Y'_{IM}$ are determined by the following equations:

$$X'_{IM} = X_{IM} + \Delta X_{IM} \quad (9)$$

$$Y'_{IM} = Y_{IM} + \Delta Y_{IM} \quad (10)$$

In the present example, the ending coordinate $X'_{IM}$ along the axis $X_{IM}$ is 554 cm (218.1 inches), and the ending coordinate $Y'_{IM}$ along the $Y_{IM}$ axis remains constant at −80.8 cm (−31.81 inches) since the vertical control 74 is not transmitting any command signals.

The ending coordinates $X'_{IM}$, $Y'_{IM}$ calculated at the block 112 are used when control passes to a block 114 to determine the ending angles $\theta'_{LM}$, $\theta'_{SM}$ of the lift boom 32 and the stick boom 34 required to position the pivot pin 40 at the ending coordinates $X'_{IM}$, $Y'_{IM}$. The controller 64 may be programmed to solve the geometric/kinematic calculations necessary to determine the angles $\theta'_{LM}$, $\theta'_{SM}$ based on the ending coordinates $X'_{IM}$, $Y'_{IM}$ of the pivot pin 40. Alternatively, as with the determinations made at the block 104, the controller 64 may be programmed with a look-up table or tables that yield the angles $\theta_{LM}$, $\theta_{SM}$ of the lift boom 32 and the stick boom 34, respectively, in the machine coordinate system required to position the pivot pin 40 at each possible coordinate $X_{IM}$, $Y_{IM}$ within the operating range 48 of the work machine 10, and may truncate or saturate the ending coordinates $X'_{IM}$, $Y'_{IM}$ as may be necessary to make sure that the values are within the operating range 48 and feasible for the kinematic elements of the work machine 10. In addition to the operating range 48, the values in the look-up tables take into account the lift boom link length $L_L$ and the stick boom link length $L_S$ particular to the work machine 10. Consequently, when the ending coordinates $X'_{IM}$, $Y'_{IM}$ (554 cm (218.1 inches), −80.8 cm (−31.81 inches)) of FIG. 5 are input, the look-up table(s) output(s) a lift boom ending angle $\theta'_{LM}$ equal to 39.4° and a stick boom ending angle $\theta'_{SM}$ equal to 25°. The ending angles $\theta'_{LM}$, $\theta'_{SM}$ in the machine coordinate system are used with the frame angle $\theta_{FG}$ to calculate the ending angles $\theta'_{LG}$, $\theta'_{SG}$ in the gravity coordinate system according to the following equations:

$$\theta'_{LG} = \theta'_{LM} + \theta_{FG} \quad (11)$$

$$\theta'_{SG} = \theta'_{SM} + \theta_{FG} \quad (12)$$

In the present example, with the frame angle $\theta_{FG}$ equal to zero, the lift boom ending angle $\theta'_{LG}$ is also equal to 39.4° and the stick boom ending angle $\theta'_{SG}$ equal to 25° in the gravity coordinate system.

After the ending angles $\theta'_{LM}$, $\theta'_{SM}$, $\theta'_{LG}$, $\theta'_{SG}$ are determined at the block 114, control passes to a block 116 where the controller 64 transmits control signals to the control valves of the lift cylinder 42 and the stick cylinder 44 to extend or retract the lift cylinder 42 and the stick cylinder 44, respectively, as necessary to reorient the lift boom 32 and the stick boom 34, respectively, at the ending angles $\theta'_{LM}$, $\theta'_{SM}$ and, correspondingly, to position the pivot pin 40 at the ending coordinates $X'_{IM}$, $Y'_{IM}$. In addition, control passes to a block 118 to set the values of the starting coordinates $X_{IM}$, $Y_{IM}$ for the pivot pin 40 equal to the ending coordinates $X'_{IM}$, $Y'_{IM}$ so that the position of the pivot pin 40 is updated for the next sampling period in which motion command signals from one or both of the controls 74, 76 are detected.

The control signals to the control valves cause the control valves to produce flow rates to rotate the lift boom 32 and stick boom 34 to the ending angles $\theta'_{LM}$, $\theta'_{SM}$ within the sampling period. Control of the control valves of the cylinders 42, 44 is performed using feedback from the inclinometers 54, 58. Control of the routine 100 passes from block 116 to a block 120 where the controller 64 compares the current orientation angles $\theta_{LG}$, $\theta_{SG}$ of the lift boom 32 and the stick boom 34 in the gravity coordinate system to the ending angles $\theta'_{LG}$, $\theta'_{SG}$ from equations (11) and (12). The controller 64 receives the orientation sensor signals from the inclinometers 54, 58 and determines the current orientation angles $\theta_{LG}$, $\theta_{SG}$ from the orientation sensor signals in a similar manner as discussed above in relation to the block 102. If the current lift boom angle $\theta_{LG}$ is not equal to the ending lift boom angle $\theta'_{LG}$ or the current stick boom angle $\theta_{SG}$ is not equal to the ending stick boom angle $\theta'_{SG}$, the lift boom 32 and the stick boom 34 have not reached the ending angles $\theta'_{LG}$, $\theta'_{SG}$. Control passes back to the block 116 for the controller 64 to continue transmitting control signals to the control valves of the cylinders 42, 44 and, if necessary, modify the control signals to change the flow rates produced by the control valves to produce rates of change of the orientation angles $\theta_{LG}$, $\theta_{SG}$ to arrive at the ending angles $\theta'_{LG}$, $\theta'_{SG}$ before the end of the sampling period. When the controller 64 determines at the block 120 that the current lift boom angle $\theta_{LG}$ is equal to the ending lift boom angle $\theta'_{LG}$ and the current stick boom angle $\theta_{SG}$ is equal to the ending stick boom angle $\theta'_{SG}$, the lift boom 32 and the stick boom 34 have reached the ending angles $\theta'_{LG}$, $\theta'_{SG}$. At this point, control returns to the block 106 for the controller 64 to monitor the inputs from the controls 74, 76 for motion command signals to move the pivot pin 40 horizontally, vertically, or both.

Figure 6:
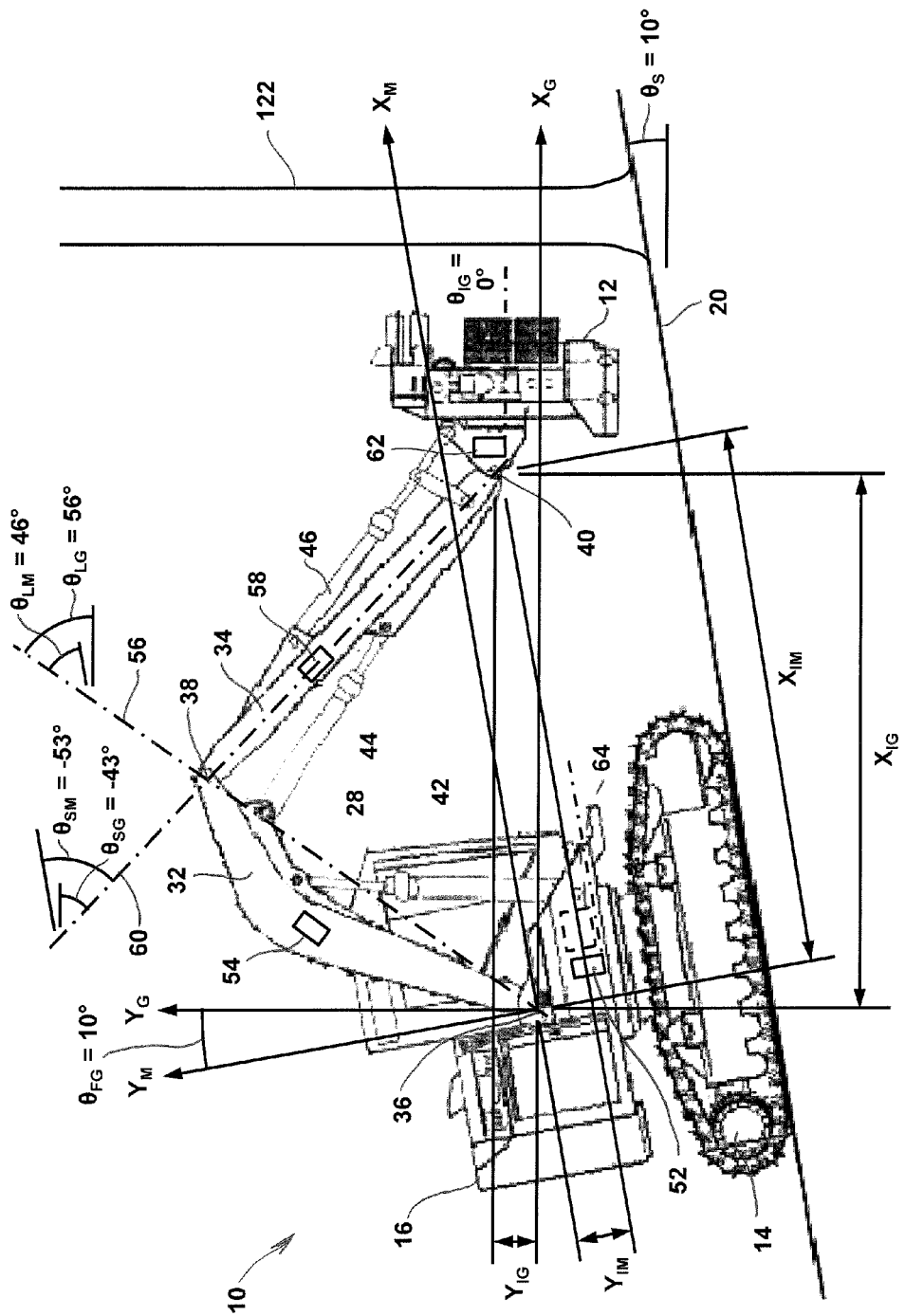
FIG. 6 is a side view of the work machine of FIG. 1 on a sloped portion of a work surface and with the linkage retracted toward the work machine.
Figure 7:
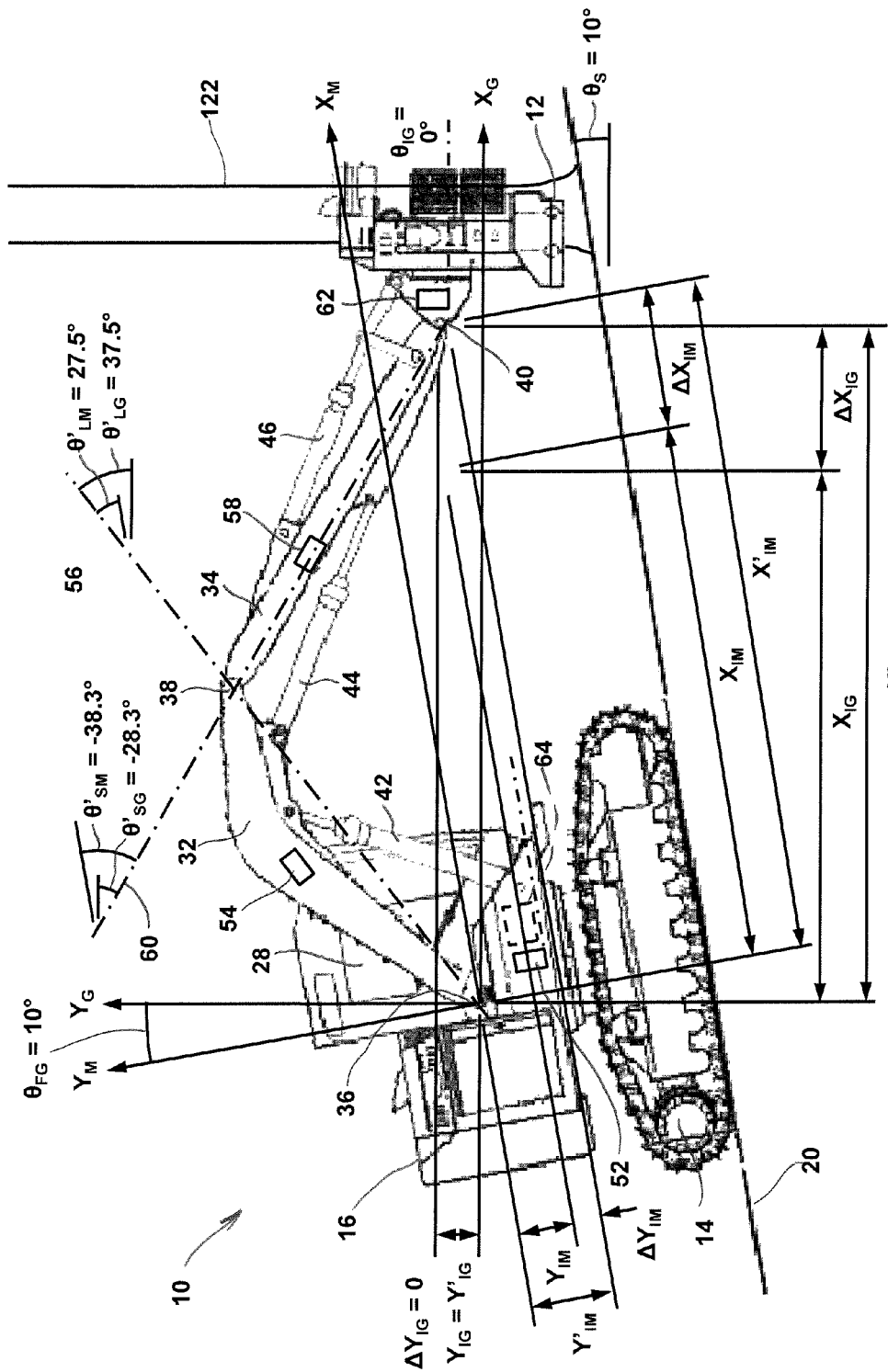
FIG. 7 is a side view of the work machine of FIG. 1 on a sloped portion of a work surface and with the linkage extended horizontally away from the work machine.

As discussed above, the implement tracking routine 100 allows the operator to control the pivot pin 40 to move horizontally or vertically in the gravity coordinate system even when the work machine 10 is operating on a sloped surface. FIGS. 6 and 7 illustrate the work machine 10 operating on the work surface 20 at a location where the work surface 20 slopes upwardly at a slope angle $\theta_S$ is the work machine 10 approaches the tree 122. The stick-implement pivot pin 40 is positioned at starting coordinates $X_{IG}$, $Y_{IG}$ in the gravity coordinate system defined by axes $X_G$, $Y_G$ originating at the frame-lift boom pivot pin 36 in a similar manner as the previous example.

Once positioned, the operator actuates the tracking mode select switch 80 to transmit a control signal to the controller 64 to initiate the implement tracking routine 100. At the block 102, the controller 64 determines the values of the orientation angles $\theta_{FG}$, $\theta_{LG}$, $\theta_{SG}$, $\theta_{IG}$ from the orientation sensor signals from the inclinometers 52, 54, 58, 62, respectively, placing the pivot pin 40 at the starting coordinates $X_{IG}$, $Y_{IG}$. The orientation sensor signal from the upper frame inclinometer 52 indicates that the angle $\theta_{FG}$ is equal to 10° due to the slope angle $\theta_S$ of the work surface 20. The orientation sensor signals from the inclinometers 54, 58 indicate that the lift boom centerline 56 is oriented with the angle $\theta_{LG}$ approximately equal to 56° and the stick boom centerline 60 is oriented with the angle $\theta_{SG}$ approximately equal to −43°. As in the previous example, the appropriate tree felling orientation of the implement 12 results in an orientation sensor signal from the implement inclinometer 62 indicating that the angle $\theta_{IG}$ is equal to zero.

The angles $\theta_{LG}$, $\theta_{SG}$ are converted to angles $\theta_{LM}$, $\theta_{SM}$ in the machine coordinate system according to equations (1) and (2). Because the work machine 10 is operating on a sloped portion of the work surface 20, the machine coordinate system is not aligned with the gravity coordinate system. As shown in the side view of FIG. 6, the machine coordinate system is rotated counterclockwise about the pivot pin 36 by the angle $\theta_{FG}$, and the machine axes $X_M$, $Y_M$ are illustrated in their rotated positions with respect to the gravity axes $X_G$, $Y_G$, respectively. Subtracting the upper frame angle $\theta_{FG}$ from the angles $\theta_{LG}$, $\theta_{SG}$ results in a link boom orientation angle $\theta_{LM}$ equal to 46° and a stick boom orientation angle $\theta_{SM}$, respectively, in the machine coordinate system. The angles $\theta_{LM}$, $\theta_{SM}$ determined at the block 102 are input, for example, into equations (3) and (4) or into look-up tables by the controller 64 at the block 104 to determine the starting coordinates $X_{IM}$, $Y_{IM}$ in the machine coordinate system. In the present example, the coordinate $X_{IM}$ along the axis $X_M$ is equal to 430 cm (169.3 inches) and the coordinate $Y_{IM}$ along the axis $Y_M$ is equal to −40.4 cm (−15.91 inches).

At the block 106, the controller 64 determines whether horizontal or vertical command signals are being transmitted by the controls 76, 74, respectively. In the present example, the operator displaces the horizontal control 76 to command the controller 64 to move the pivot pin 40 horizontally toward the tree 122, and the vertical control 74 remains in the neutral position. When the horizontal command signal is detected by the controller 64, control passes to the block 108 to calculate the horizontal position change $\Delta X_{IG}$ and the vertical position change $\Delta Y_{IG}$ commanded by the operator in the gravity coordinate system using the equations (5) and (6). As in the preceding example, the position change for the full travel of the pivot pin 40 to the tree 122 is used in the following calculations. As a result, the horizontal position change $\Delta X_{IG}$ is equal to 127 cm (50 inches) and the vertical position change $\Delta Y_{IG}$ is equal to zero as shown in FIG. 7.

The position changes $\Delta X_{IG}$, $\Delta Y_{IG}$ in the global coordinate system are converted to position changes $\Delta X_{IM}$, $\Delta Y_{IM}$ in the machine coordinate system at the block 110 using the two-dimensional rotation matrix equations (7) and (8). Due to the rotation of the machine frame of reference, the position changes in the machine coordinate system are different than the position changes in the global coordinate system. Consequently, equations (7) and (8) yield a position change $\Delta X_{IM}$ along the axis $X_M$ of 124 cm (48.82 inches), and a position change $\Delta Y_{IM}$ along the axis $Y_M$ of −21.6 cm (−8.504 inches). At the block 112, the position changes $\Delta X_{IM}$, $\Delta Y_{IM}$ are added to the starting coordinates $X_{IM}$, $Y_{IM}$ in the machine coordinate system in the equations (9) and (10) to produce ending coordinates $X'_{IM}$, $Y'_{IM}$ equal to 554 cm (218.1 inches) and −62.0 cm (−24.41 inches), respectively.

The ending coordinates $X'_{IM}$, $Y'_{IM}$ are input into the equations or look-up tables by the controller 64 at the block 114. In the present example, the values of the ending coordinates $X'_{IM}$, $Y'_{IM}$ result in an output of an ending orientation angle $\theta'_{LM}$ for the lift boom 32 equal to 27.5°, and an ending orientation angle $\theta'_{SM}$ for the stick boom 34 equal to −38.3°. An ending orientation angle $\theta'_{LG}$ for the lift boom 32 equal to 37.5°, and an ending orientation angle $\theta'_{SG}$ for the stick boom 34 equal to −28.3° in the gravity coordinate system are derived from equations (11) and (12) given the frame angle $\theta_{FG}$ being equal to 10°. The controller 64 uses the values of the ending orientation angles $\theta'_{LM}$, $\theta'_{SM}$ at the block 116 to generate control signals for the control valves of the cylinders 42, 44 to reorient the lift boom 32 and the stick boom 34, respectively, and thereby position the pivot pin 40 at the ending coordinates $X'_{IM}$, $Y'_{IM}$. The actual orientation angles $\theta_{LG}$, $\theta_{SG}$ in the gravity coordinate system derived from the values in the orientation sensor signals from the inclinometers 54, 58 are compared to the ending orientation angles $\theta'_{LG}$, $\theta'_{SG}$ at the block 120, and transmission of the control signals to the control valves continues until the actual orientation angles $\theta_{LG}$, $\theta_{SG}$ are equal to the ending orientation angles $\theta'_{LG}$, $\theta'_{SG}$. Before returning control to the block 106, the controller 64 sets the values of the starting coordinates $X_{IM}$, $Y_{IM}$ of the pivot pin 40 equal to the ending coordinates $X'_{IM}$, $Y'_{IM}$ at the end of the current sampling period for use in the calculations during the subsequent sampling period in which the controller 64 detects vertical and/or horizontal motion commands from the controls 74, 76.

At the same time the cylinders 42, 44 are being controlled by controller 64 to position the pivot pin 40 in the implement tracking mode, the controller 64 may execute an implement orientation strategy to maintain the implement orientation angle $\theta_{IG}$ at or within an acceptable range about a specified target implement angle $\theta_{IGT}$ where the implement 12 such as the illustrated fixed processor head is positioned by the tilt cylinder 46 and the orientation of the implement 12 is important to the task being performed, and is not dangling freely like a dangling head on a harvester linkage, tongs, a clamshell bucket and the like. Using the implement orientation angle $\theta_{IG}$ as an input in the closed-loop control strategy, the controller 64 compares the implement angle $\theta_{IG}$ to the target angle $\theta_{IGT}$ and transmits control signals to the control valve of the tilt cylinder 46 to extend or retract the tilt cylinder 46 as necessary to rotate the implement 12 toward the target angle $\theta_{IGT}$ if the implement 12 is not at the target orientation. In a simple implementation, a single target angle $\theta_{IGT}$ may be specified for the implement 12 for the duration that the work machine 10 is in the implement tracking mode and when the implement is stationary or moving based on the motion commands transmitted by the controls 74, 76.

Figure 8:
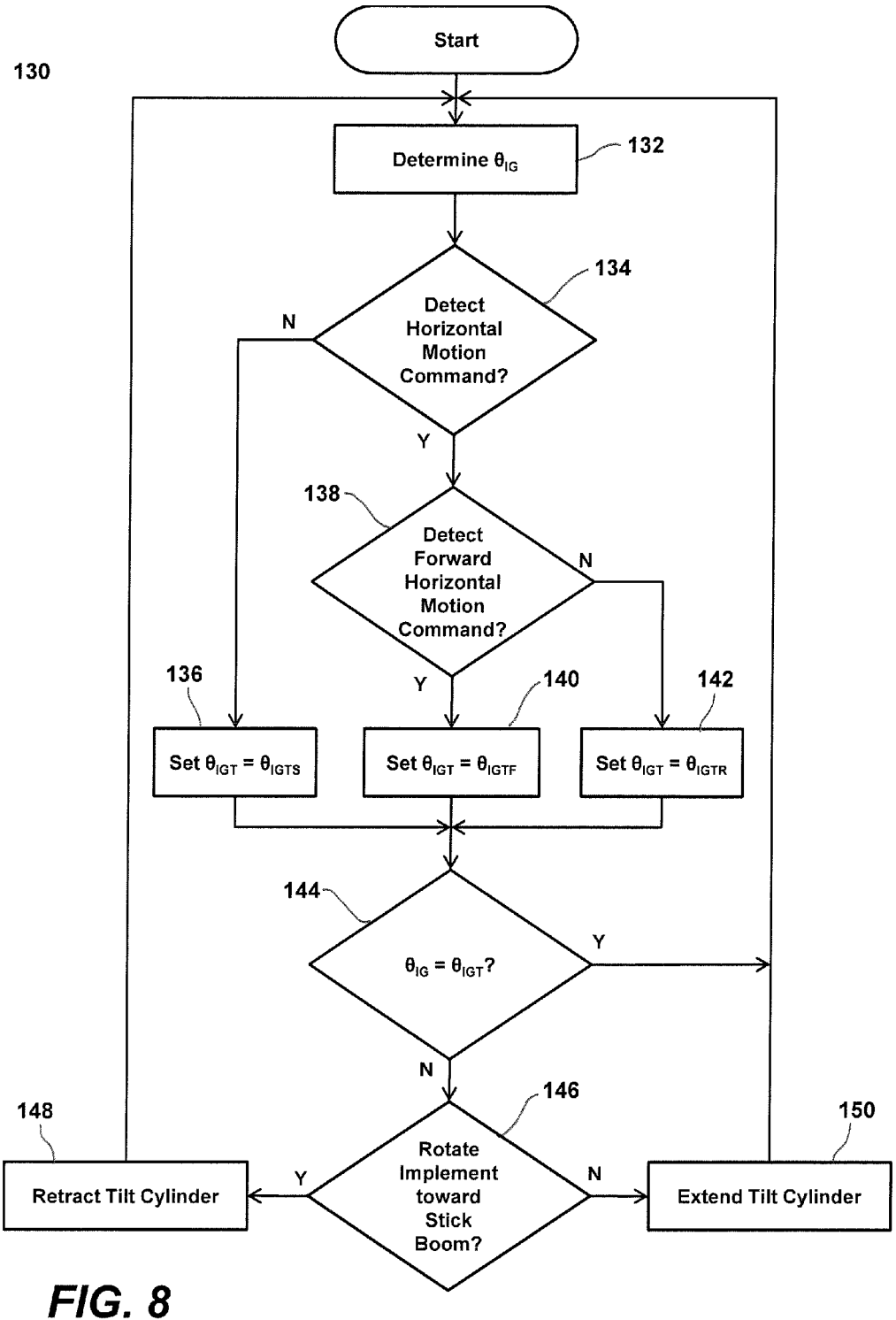
FIG. 8 is a flow diagram of an implement orientation routine in accordance with the present disclosure for the work machine of FIG. 1.

In other implementations, the controller 64 may be configured with more complex strategies for controlling the orientation of the implement 12. For example, it may be desirable to specify different target angles for the implement 12 that correspond to the motion, or lack thereof, of the implement 12. FIG. 8 illustrates an example of an implement orientation routine 130 that may be executed concurrently with the implement tracking routine 100 to control the orientation of the implement 12 during horizontal forward movement and retraction of the implement 12. In this exemplary control strategy, the controller 64 may be configured to orient the implement 12 at a stationary target angle $\theta_{IGTS}$ when the implement 12 is not moving, at a forward target angle $\theta_{IGTF}$ when the implement is moving forward such as, for example, from the position shown in FIG. 6 to the position shown in FIG. 7, and at a retracting or rearward target angle $\theta_{IGTR}$ when the implement is retracted toward the upper frame 16. The implement orientation routine 130 is an iterative process that may execute at the same sampling rate SR as the implement tracking routine 100, or may execute at faster or slower sampling rate to provide the required precision and speed of response in reorienting the implement 12 to the target position.

When the operator actuates the tracking mode select switch 80, the routine 130 begins at a block 132 where the controller 64 determines the current implement orientation angle $\theta_{IG}$ based on the orientation sensor signal from the implement inclinometer 62 in a similar manner as discussed with respect to the block 102 of the implement tracking routine 100. After the current implement orientation angle $\theta_{IG}$ is known, control passes to a block 134 to determine whether a horizontal motion command signal is being transmitted by the horizontal control 76. If no horizontal motion command signal is detected by the controller 64, control may pass to a block 136 where the controller 64 sets the target implement orientation angle $\theta_{IGT}$ equal to the stationary target angle $\theta_{IGS}$.

If a horizontal motion command signal is detected by the controller 64 at the block 134, control passes to a block 138 to determine whether the horizontal motion command signal is commanding forward or rearward motion of the implement 12. If the horizontal motion command signal indicates forward motion of the implement 12, control passes to a block 140 to set the target implement orientation angle $\theta_{IGT}$ equal to the forward target angle $\theta_{IGF}$. Conversely, if the horizontal motion command signal indicates rearward motion of the implement 12, control passes to a block 142 to set the target implement orientation angle $\theta_{IGT}$ equal to the rearward target angle $\theta_{IGR}$.

After the value of the target implement orientation angle $\theta_{IGT}$ is set at the block 136, 140 or 142, control passes to a block 144 to determine whether the current implement orientation angle $\theta_{IG}$ is equal to or within an acceptable range about the appropriate target implement orientation angle $\theta_{IGT}$. If the current implement orientation angle $\theta_{IG}$ is equal to or within the acceptable range about the appropriate target implement orientation angle $\theta_{IGT}$, no adjustment of the orientation of the implement 12 is required during the current sampling period and control can pass back to the block 132 to determine the implement orientation angle $\theta_{IG}$ for the next sampling period.

If the current implement orientation angle $\theta_{IG}$ is not equal to or within the acceptable range about the target implement orientation angle $\theta_{IGT}$, control passes to a block 146 to determine whether the implement 12 must be rotated toward the stick boom 34, i.e. the tilt cylinder 46 must be retracted, to move the implement 12 toward the target implement orientation angle $\theta_{IGT}$. For example, if the implement 12 is being moved forward, the target implement orientation angle $\theta_{IGT}$ may be set to a forward target angle $\theta_{IGF}$ equal to $-3°$ in the gravity coordinate system of the previous examples. If the current implement orientation angle $\theta_{IG}$ is equal to $-6°$, the implement 12 is rotated too far clockwise and must be rotated counterclockwise toward the stick boom 34 by retracting the tilt cylinder 46. If the implement 12 is being moved rearward, the target implement orientation angle $\theta_{IGT}$ may be set to a rearward target angle $\theta_{IGR}$ equal to $+3°$ in the gravity coordinate system. A current implement orientation angle $\theta_{IG}$ equal to $+1°$ indicates that the implement 12 does not have enough counterclockwise rotation and must be further rotated counterclockwise by retracting the tilt cylinder 46. If the controller 64 determines that these conditions exist, control passes to a block 148 where the controller 64 issues control signals to the control valve of the tilt cylinder 46 to retract the tilt cylinder 46 and rotate the implement 12 counterclockwise toward the target implement orientation angle $\theta_{IGT}$. If the opposite condition exists and the implement 12 must be rotated clockwise away from the stick boom 34, control passes to a block 150 where the controller 64 issues control signals to the control valve of the tilt cylinder 46 to extend the tilt cylinder 46 and rotate the implement 12 clockwise toward the target implement orientation angle $\theta_{IGT}$. After the command signals are transmitted to the control valve of the tilt cylinder 46 at block 148 or block 150, control passes back to the block 132 to determine the implement orientation angle $\theta_{IG}$ for the next sampling period.

The present example of the implement orientation routine 130 relates to controlling the implement orientation angle $\theta_{IG}$ during horizontal movements of the implements. However, those skilled in the art will understand that similar routines may be implemented to control the implement orientation during vertical motion, or combinations of vertical and horizontal motion, while the work machine 10 is in the implement tracking mode. Also, the target implement orientation angle $\theta_{IGT}$ may be dependent on the position of the implement 12 or its components such as grab and accumulate arms on a felling head. Moreover, a desired amount of precision in the control of the implement orientation may be programmed into the routines through the specification of the target orientation angles $\theta_{IGS}$, $\theta_{IGF}$, $\theta_{IGR}$. The target angles may have specific values so that the tilt cylinder 46 is not actuated only when the current implement orientation angle $\theta_{IG}$ matches the target angle. Alternatively, the target implement orientation angle $\theta_{IGT}$ may have an associated range of values within which the current implement orientation angle $\theta_{IG}$ must fall to avoid actuating the tilt cylinder 46. For example, the target angle $\theta_{IGT}$ may have a specified range of $\pm 1°$ around the target angle $\theta_{IGT}$ and the controller 64 at the block 144 may compare the current implement orientation angle $\theta_{IG}$ to the target angle range. For example, where the forward target angle $\theta_{IGF}$ is equal to $-3°$, the orientation of the implement 12 is only adjusted when the current implement orientation angle $\theta_{IG}$ is outside the range from $-2°$ to $-4°$ and the implement 12 is moving forward. Similarly, where the rearward target angle $\theta_{IGR}$ is equal to $+5°$, the orientation of the implement 12 is only adjusted when the current implement orientation angle $\theta_{IG}$ is outside the range from $+4°$ to $+6°$ when the implement 12 is moving rearward. As a further alternative, each of the target orientation angles $\theta_{IGS}$, $\theta_{IGF}$, $\theta_{IGR}$ may be specified as a range of angles that are acceptable orientations of the implement 12. Relatively tight control of the implement orientation angle $\theta_{IG}$ may be desired when the implement 12 moves forward towards the tree 122, and the forward target angle $\theta_{IGR}$ may be specified as the range from −2° to −4°, while a broader range of acceptable orientations is allowable when the implement 12 moves rearward and the rearward target angle $\theta_{IGR}$ may be specified as the range from +3° to +7°. It will also be apparent to those skilled in the art that the routine 130 need not be configured with separate target angles for forward movement, rearward movement and the stationary condition.

The implement tracking routine 100 as implemented in the controller 64 may account for variations that can occur in the various kinematic elements of the work machine 10 that are relevant to positioning the pivot pin 40 and the implement 12. For example, in some work machines 10, a telescopic stick boom 34 is formed as a cylinder-within-a-cylinder arrangement having a control valve operable to extend and retract the inner cylinder to change the length of the stick boom 34 and, correspondingly, the stick boom length $L_S$ used in determining the coordinates $X_G$, $Y_G$ and $X_M$, $Y_M$ in the implement tracking routine 100. The routine 100 may be modified to use the actual stick boom length $L_S$ in, for example, equations (3) and (4). The controller 64 may calculate the actual stick boom length $L_S$ based on the status of the control valve and input the value in the equations (3) and (4). Similarly, where look-up tables are used, the tables may be configured with the coordinates $X_{IM}$, $Y_{IM}$ produced by each combination of lift boom angle $\theta_{LM}$, stick boom angle $\theta_{SM}$ and actual stick boom length $L_S$, with the actual stick boom length $L_S$ being an additional input to the look-up tables at the block 104.

Other variations in the kinematic elements may be handled in a similar manner. In the example of the telescopic stick boom 34, it may be desirable or necessary to change the stick boom length $L_S$ to move the pivot pin 40 from the initial coordinates XIG, YIG and XIM, YIM to the ending coordinates $X'_{IG}$, $Y'_{IG}$ and $X'_{IM}$, $Y'_{IM}$. This may be the case when the ending coordinates $X'_{IG}$, $Y'_{IG}$ and $X'_{IM}$, $Y'_{IM}$ are near the limits of the operating range 48 of the machine 10. The equations or look-up tables used by the controller 64 at the block 114 may be modified to output an ending stick boom length $L'_S$ along with the ending angles $\theta'_{LM}$, $\theta'_{SM}$, and the controller 64 may be configured to send control signals to a control valve of the telescopic stick boom 34 to extend or retract the inner cylinder of the stick boom 34. Because the stick boom length $L_S$ is variable, many ending coordinates $X'_{IM}$, $Y'_{IM}$ may be achieved with multiple combinations of ending stick boom length $L'_S$ and ending angles $\theta'_{LM}$, $\theta'_{SM}$, so the routine 100 may be configured for the controller 64 to determine an optimal combination of the ending stick boom length $L'_S$ and the ending angles $\theta'_{LM}$, $\theta'_{SM}$ from among the available combinations based on current operating conditions of the work machine 10 such as the initial coordinates $X_{IG}$, $Y_{IG}$ of the pivot pin 40. Similar modifications may be made to the routine 100 for use with other variations of kinematic elements for moving the pivot pin 40, such as work machines 10 having arrangements with three or more booms where multiple combinations of orientations of the booms are possible to locate the pivot pin 40 at specific ending coordinates $X'_{IM}$, $Y'_{IM}$.

As discussed above, the work machine 10 has an operating range 48 of coordinates at which the stick-implement pivot pin 40 may be positioned. The implement tracking routine 100 may be configured to ensure that the controller 64 does not attempt to operate the work machine 10 in a manner that will cause the pivot pin 40 to approach the outer boundaries of the operating range 48 in a way that may cause damage to the components of the work machine 10. For example, where the ending coordinates $X'_{IM}$, $Y'_{IM}$ determined at block 112 fall outside the operating range 48, the routine 100 may be configured so that the controller 64 calculates alternate ending coordinates $X'_{IM}$, $Y'_{IM}$ along the path of motion of the pivot pin 40 that are within the operating range 48 and provides the alternate ending coordinates $X'_{IM}$, $Y'_{IM}$ to the block 114 for determining the ending angles $\theta'_{LM}$, $\theta'_{SM}$. Subsequently, any attempts to move the pivot pin 40 beyond the operating range 48 may result in the controller 64 maintaining the pivot pin 40 and the pivot pin 40 in position at the limit of the operating range 48 until motion command signals are received to cause movement of the pivot pin 40 to positions within the operating range 48. Those skilled in the art will understand that other limiting strategies may be programmed into the implement tracking routine 100 to prevent conditions that may cause damage to the components of the work machine 10, and such strategies are contemplated by the inventors as having use in work machines 10 in accordance with the present disclosure.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

The claims of the patent are:
1. A work machine comprising:
   a frame;
   a lift boom having a first end and an oppositely disposed second end, with the first end of the lift boom pivotally connected to the frame by a first pivot pin;
   a stick boom having a first end and an oppositely disposed second end, with the first end of the stick boom pivotally connected to the second end of the lift boom by a second pivot pin;
   an implement pivotally connected to the second end of the stick boom by a third pivot pin;
   a lift boom actuation mechanism operatively connected to the lift boom and operable to pivot the lift boom about the first pivot pin relative to the frame;
   a stick boom actuation mechanism operatively connected to the stick boom and operable to pivot the stick boom about the second pivot pin relative to the lift boom;
   a first operator control configured to transmit motion command signals; and
   a controller operatively connected to the lift boom actuation mechanism, the stick boom actuation mechanism and the first operator control,
      the controller being configured to determine a current position of the third pivot pin relative to the first pivot pin based on a first lift boom orientation angle and a first stick boom orientation angle,
      the controller being configured to detect the motion command signals from the first operator control,
      the controller being configured to determine an ending position of the third pivot pin relative to the first pivot pin in response to detecting the motion command signals, and
      the controller being configured to actuate the lift boom actuation mechanism to rotate the lift boom to a second lift boom orientation angle and to actuate the stick boom actuation mechanism to rotate the stick boom to a second stick boom orientation angle to move the third pivot pin from the current position to the ending position.

2. The work machine of claim 1, comprising:
a lift boom orientation sensor operatively connected to the controller and transmitting lift boom orientation sensor signals having a value indicating a lift boom orientation angle in a gravity coordinate system, wherein the controller is configured to determine the first lift boom orientation angle based on the lift boom orientation sensor signals;
a stick boom orientation sensor operatively connected to the controller and transmitting stick boom orientation sensor signals having a value indicating a stick boom orientation angle in the gravity coordinate system, wherein the controller is configured to determine the first stick boom orientation angle based on the stick boom orientation sensor signals.

3. The work machine of claim 2, comprising:
a frame orientation sensor operatively connected to the controller and transmitting frame orientation sensor signals having values indicating a frame orientation angle in the gravity coordinate system,
wherein the controller is configured to determine the first lift boom orientation angle by subtracting the frame orientation angle from the lift boom orientation angle indicated by the lift boom orientation sensor signals and to determine the first stick boom orientation angle by subtracting the frame orientation angle from the stick boom orientation angle indicated by the stick boom orientation sensor signals, and
wherein the current position of the third pivot pin, the ending position of the third pivot pin, the first lift boom orientation angle and the first stick boom orientation angle are values in a machine coordinate system that is offset from the gravity coordinate system by rotating the gravity coordinate system through the frame orientation angle.

4. The work machine of claim 3, comprising:
a second operator control operatively connected to the controller and configured to transmit motion command signals,
wherein the controller is configured to detect the motion command signals from the second operator control,
wherein the controller is configured to determine a commanded horizontal movement distance of the third pivot pin in the gravity coordinate system based on the motion command signals from the first operator control, and
wherein the controller is configured to determine a commanded vertical movement distance of the third pivot pin in the gravity coordinate system based on the motion command signals from the second operator control.

5. The work machine of claim 4, wherein the controller is configured to convert the commanded horizontal movement distance and the commanded vertical movement distance in the gravity coordinate system into movement distances in the machine coordinate system based on the frame orientation angle.

6. The work machine of claim 5, wherein the controller is configured to determine the ending position of the third pivot pin in the machine coordinate system by adding the movement distances in the machine coordinate system to the current position of the third pivot pin in the machine coordinate system.

7. The work machine of claim 6, wherein the controller is configured to determine the second lift boom orientation angle and the second stick boom orientation angle in the machine coordinate system based on the ending position of the third pivot pin in the machine coordinate system.

8. The work machine of claim 1, comprising:
a second operator control operatively connected to the controller and configured to transmit motion command signals,
wherein the controller is configured to detect the motion command signals from the second operator control,
wherein the controller is configured to operate in a normal mode wherein the controller actuates the lift boom actuation mechanism to rotate the lift boom relative to the frame in response to receiving the motion command signals from one of the first operator control and the second operator control and actuates the stick boom actuation mechanism to rotate the stick boom relative to the lift boom in response to receiving the motion command signals from the other of the first operator control and the second operator control, and
wherein the controller is configured to operate in a tracking mode wherein the controller determines a commanded horizontal movement distance of the third pivot pin in response to receiving the motion command signals from the first operator control and determines a commanded vertical movement distance of the third pivot pin in response to receiving the motion command signals from the second operator control.

9. A method for positioning an implement of a work machine having a frame, a lift boom having a first end and an oppositely disposed second end, with the first end of the lift boom pivotally connected to the frame by a first pivot pin, a stick boom having a first end and an oppositely disposed second end, with the first end of the stick boom pivotally connected to the second end of the lift boom by a second pivot pin, and the implement is pivotally connected to the second end of the stick boom by a third pivot pin, the method comprising:
determining at a controller a current position of the third pivot pin relative to the first pivot pin based on a first lift boom orientation angle and a first stick boom orientation angle;
detecting at the controller a motion command signal from an operator control;
determining at the controller an ending position of the third pivot pin relative to the first pivot pin in response to detecting the motion command signal; and
transmitting control signals from the controller to cause the lift boom to move to a second lift boom orientation angle and the stick boom to move to a second stick boom orientation angle to move the third pivot pin from the current position to the ending position.

10. The method of claim 9, comprising:
determining at the controller the first lift boom orientation angle based on a lift boom orientation sensor signal from a lift boom orientation sensor; and
determining at the controller the first stick boom orientation angle based on a stick boom orientation sensor signal from a stick boom orientation sensor.

11. The method of claim 10, comprising:
determining at the controller a frame orientation angle based on a frame orientation sensor signal from a frame orientation sensor;
determining at the controller the first lift boom orientation angle by subtracting the frame orientation angle from a lift boom orientation angle indicated by the lift boom orientation sensor signal; and
determining at the controller the first stick boom orientation angle by subtracting the frame orientation angle from a stick boom orientation angle indicated by the stick boom orientation sensor signal,
wherein the current position of the third pivot pin, the ending position of the third pivot pin, the first lift boom orientation angle and the first stick boom orientation angle are values in a machine coordinate system that is offset from a gravity coordinate system by rotating the gravity coordinate system through the frame orientation angle.

12. The method of claim 11, wherein the operator control of the work machine comprises a first operator control and a second operator control, the method comprising:
determining at the controller a commanded horizontal movement distance of the third pivot pin in the gravity coordinate system based on the motion command signal from the first operator control; and
determining at the controller a commanded vertical movement distance of the third pivot pin in the gravity coordinate system based on the motion command signal from the second operator control.

13. The method of claim 12, comprising converting at the controller the commanded horizontal movement distance and the commanded vertical movement distance in the gravity coordinate system into movement distances in the machine coordinate system based on the frame orientation angle.

14. The method of claim 13, comprising determining at the controller the ending position of the third pivot pin in the machine coordinate system by adding the movement distances in the machine coordinate system to the current position of the third pivot pin in the machine coordinate system.

15. The method of claim 14, comprising determining at the controller the second lift boom orientation angle and the second stick boom orientation angle in the machine coordinate system based on the ending position of the third pivot pin in the machine coordinate system.

16. The method of claim 9, wherein the operator control of the work machine comprises a first operator control and a second operator control, the method comprising:
operating in a normal mode comprising:
transmitting control signals from the controller to cause the lift boom to rotate relative to the frame in response to receiving the motion command signal from one of the first operator control and the second operator control, and
transmitting control signals from the controller to cause the stick boom to rotate relative to the lift boom in response to receiving the motion command signal from the other of the first operator control and the second operator control; and
operating the work machine in a tracking mode comprising:
determining at the controller a commanded horizontal movement distance of the third pivot pin in response to receiving the motion command signal from the first operator control, and
determining at the controller a commanded vertical movement distance of the third pivot pin in response to receiving the motion command signal from the second operator control.

17. A work machine comprising:
a frame;
a boom having a first end and an oppositely disposed second end, with the first end of the boom operatively connected to the frame for movement relative to the frame that includes rotational motion;
an implement pivotally connected to the second end of the boom by a pivot pin;
an implement actuation mechanism operatively connected to the implement and operable to pivot the implement about the pivot pin relative to the boom; and
a controller operatively connected to the implement actuation mechanism,
the controller being configured to determine a current implement orientation angle of the implement,
the controller being configured to compare the current implement orientation angle of the implement to a target orientation angle, and
the controller being configured to actuate the implement actuation mechanism to rotate the implement about the pivot pin toward the target orientation angle in response to determining that the current implement orientation angle is not equal to the target orientation angle.

18. The work machine of claim 17, comprising an operator control configured to transmit motion command signals, the controller being configured to determine if the operator control is transmitting motion command signals, to set the target orientation angle equal to a stationary target orientation angle in response to determining that the operator control is not transmitting the motion command signals, and to set the target orientation angle equal to a moving target orientation angle in response to determining that the operator control is transmitting motion control signals.

19. The work machine of claim 18, wherein the moving target orientation angle comprises a first target orientation angle for translational movement of the implement in a first direction and a second target orientation angle for translational movement of the implement in a second direction, wherein the controller is configured to determine a commanded direction of translational movement of the implement in response to determining that the operator control is transmitting motion control signals, to set the target orientation angle equal to the first target orientation angle in response to determining that the commanded direction of translational movement is the first direction, and to set the target orientation angle equal to the second target orientation angle in response to determining that the commanded direction of translational movement is the second direction.

20. The work machine of claim 17, wherein the target orientation angle comprises a range of angles having an upper limit target angle and a lower limit target angle, and wherein the controller is configured to actuate the implement actuation mechanism to rotate the implement in a first direction toward the range of angles in response to determining that the current implement orientation angle is less than the lower limit target angle, and to actuate the implement actuation mechanism to rotate the implement in an opposite direction toward the range of angles in response to determining that the current implement orientation angle is greater than the upper limit target angle.

21. The work machine of claim 17, comprising an implement orientation sensor operatively connected to the controller and transmitting implement orientation sensor signals having a value indicating an implement orientation angle in a gravity coordinate system, wherein the controller is configured to determine the current implement orientation angle based on the implement orientation sensor signals.

* * * * *